E. LAND.

TELEPHONE EXCHANGE SYSTEM.

APPLICATION FILED AUG. 9, 1906.

Reissued Apr. 20, 1909.

12,943.

4 SHEETS—SHEET 1.

L.

Witnesses

Carolyn Ueber

L. D. Kellogg

Inventor

Edmund Land by Thomas H. Ferguson

Attorney

E. LAND.

TELEPHONE EXCHANGE SYSTEM.

APPLICATION FILED AUG. 9, 1906.

Reissued Apr. 20, 1909.

12,943.

4 SHEETS—SHEET 2.

R

Witnesses

Carolyn Weber

L. D. Kellogg

Inventor

Edmund Land by Thomas H. Ferguson

Attorney

NORRIS PETERS CO. PHOTO-LITHO. WASHINGTON, D. C.

E. LAND.

TELEPHONE EXCHANGE SYSTEM.

APPLICATION FILED AUG. 9, 1906.

Reissued Apr. 20, 1909.

12,943.

4 SHEETS—SHEET 3.

Witnesses

Carolyn Weber

L. D. Willogg

Inventor

Edmund Land by Thomas H. Ferguson

Attorney

NORRIS PETERS, INC. LITHO., WASHINGTON, D. C.

E. LAND.

TELEPHONE EXCHANGE SYSTEM.

APPLICATION FILED AUG. 9, 1906.

Reissued Apr. 20, 1909.

12,943.

4 SHEETS—SHEET 4.

Witnesses

Carolyn Weber

L. D. Kellogg

Inventor

Edmund Land by Thomas H. Ferguson

Attorney

UNITED STATES PATENT OFFICE.

EDMUND LAND, OF GRAND RAPIDS, MICHIGAN, ASSIGNOR TO MILO G. KELLOGG, OF CHICAGO, ILLINOIS.

TELEPHONE-EXCHANGE SYSTEM.

No. 12,943. Specification of Reissued Letters Patent. Reissued April 20, 1909.

Original No. 818,540, dated April 24, 1906, Serial No. 250,933. Application for reissue filed August 9, 1906. Serial No. 329,949.

*To all whom it may concern:*

Be it known that I, EDMUND LAND, a citizen of the Dominion of Canada, and a resident of Grand Rapids, county of Kent, and State of Michigan, have invented a new and useful Improvement in Telephone-Exchange Systems, of which the following is a specification.

My invention pertains to semi-automatic telephone exchange equipment. By the term "semi-automatic" I indicate those systems in which automatic selecting equipment is supplemented by the attention of a central-office operator who assists in promoting the connection to the desired station.

I provide a system of keys for automatic selecting, ringing, and supervising with associated circuits and automatic selecting switches which will give to the central-office operator facilities for promoting with the greatest rapidity orders received by telephonic transmission from the calling patron and to enable her to supervise and disconnect such connection with the greatest accuracy and ease. No flexible cords are used. It is believed that the system shown in this description and drawings will afford for the operator facilities for completing a greater number of connections per unit of time than any known method of manual operating with cords, plugs, and jacks, and will afford for the patron a system involving the advantage of manual supervision of the connection.

Figure 1:
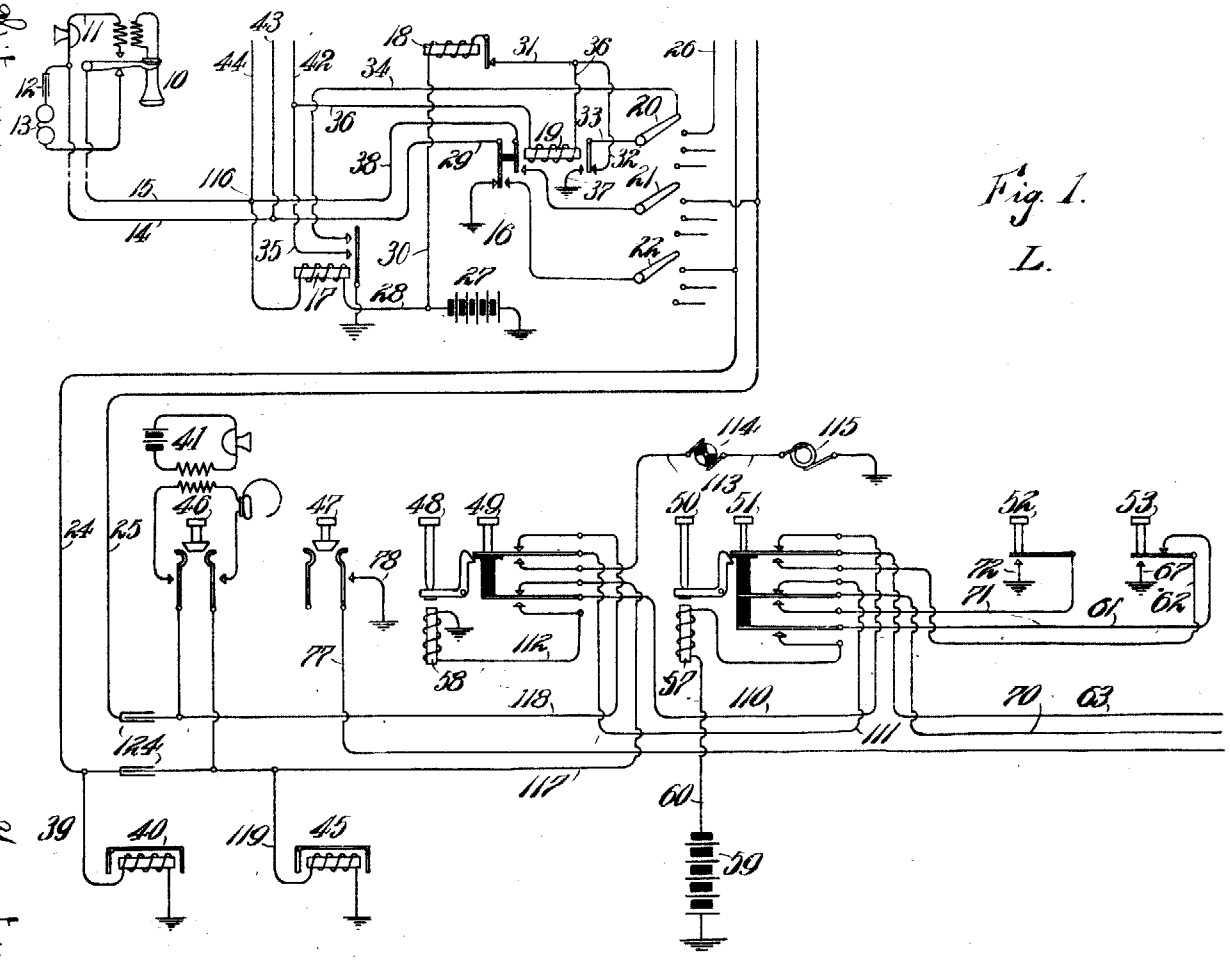
Figure 1:
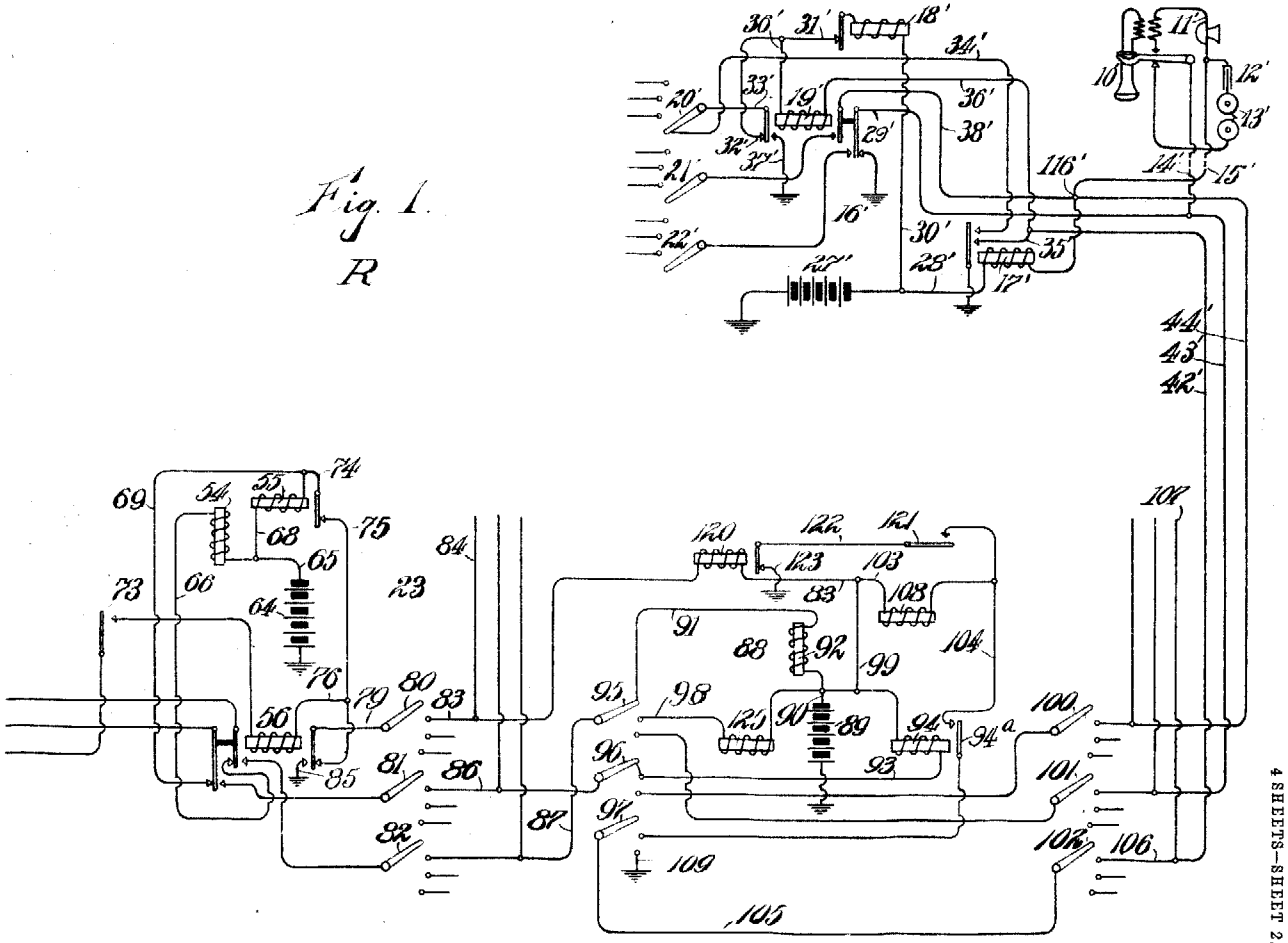
Figure 2:
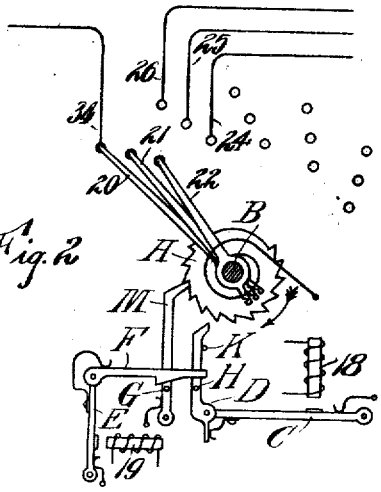
Figure 3:
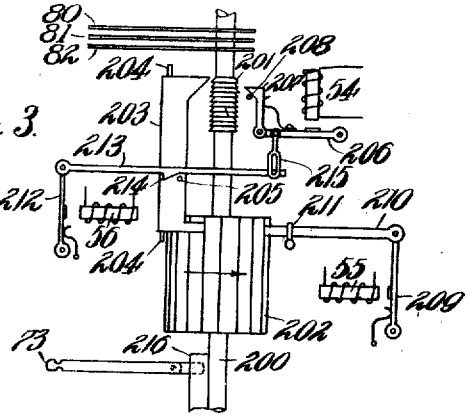
Figure 4:
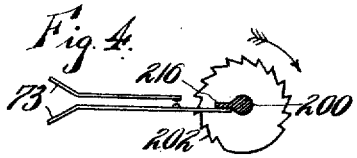
Figure 5:
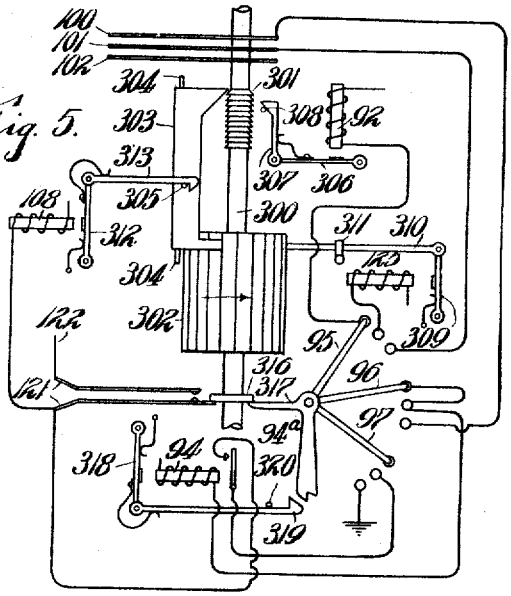
Figure 6:
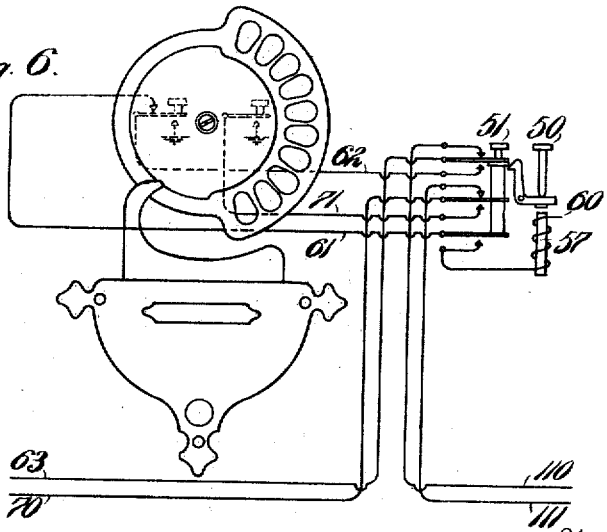

In the drawings, Figure 1 is a general circuit diagram of my invention, the figure being drawn on two sheets designed to be placed end to end to complete the figure. Fig. 2 is a diagrammatic detail of the switch forming a part of the line equipment 16. Fig. 3 is a diagrammatic detail of the automatic switch 23. Fig. 4 is an additional detail of the off-normal switch of Fig. 3. Fig. 5 is a diagrammatic detail of the automatic switch 88, and Fig. 6 shows diagrammatically an alternative form of selecting-key device for the operator's equipment 41.

Relays, keys, visual signals, &c., are shown in conventional form, as my invention does not in any way involve the mechanical detail of the respective parts of apparatus used.

At 10 is shown a common battery substation telephone equipment of a well-known type in which circuit through conductor 11 is closed for direct current when the hook is up, and circuit through a condenser 12 and high-resistance ringer 13 is closed for alternating current when the hook is down. This substation telephone is connected by line conductors 14 and 15 with an automatic central office equipment pertaining individually to that line and indicated as a whole at 16.

The line equipment 16 consists of an automatic circuit-selecting switch of any desired mechanical type, the associated operating-magnets of said switch, relay-armatures, and contacts for said operating-magnets, and an associated relay 17, not necessarily mechanically a part of said automatic switch. In said automatic switch, 18 is a magnet adapted to propel the moving part of the switch, and 19 is a magnet adapted to release said moving part for restoration to its normal position of rest through action of springs or gravity. 20, 21, 22 are moving contact terminals or wipers attached to the moving part of said automatic switch and adapted to make contact with fixed terminals or waiting contacts as those shown associated with conductors 25, 26, 24.

In mechanical design, the automatic switch mechanism of the equipment 16 may be of any desired form, a diagrammatic representation of the conditions required for this switch being shown in Fig. 2, in which the designating numerals given are those of Fig. 1, some further parts being designated by letters.

In Fig. 2, B is a shaft supporting insulated wipers 20, 21, 22. A is a ratchet mounted upon the shaft B. C is an armature for magnet 18. D is a pawl pivoted upon armature C. K is a fixed pin guiding pawl D. H is a pin upon pawl D. M is a pivoted detent-pawl. G is a pin upon pawl M. E is an armature for magnet 19. F is a link pivoted upon armature E and having a hook projection to engage pin G, and a straight arm projection to be engaged by pin H. In operation successive energizations of magnet 18 will attract armature C successively, and thus cause driving-pawl D to propel ratchet A one tooth for each such energization, the ratchet A being held in its determined position by the detent-pawl M. Following this, the energization of magnet 19 will attract its armature E, causing link F to pass forward until its hook projection passes over pin G, the ratchet A being retained by detent-pawl M during the continuance of the energization of magnet 19. Upon deënergization of magnet 19 and consequent release of armature E and return of that armature by spring tension to its position of rest, link F retires to its normal position of rest, and in doing so its hook projection engages pin G on detent-pawl M and withdraws said detent-pawl from engagement with ratchet A. Ratchet A therefore is released and now may return to its normal position of rest by action of springs or gravity. Upon the next energization of magnet 18 and consequent movement of armature C and pawl D, pin H engages link F and lifts it until its hook projection is lifted out of engagement with pin G, thus releasing detent-pawl M to act as previously mentioned.

Referring again to Fig. 1, the step-by-step movement of the wipers 20, 21 22 causes them to make contact successively with the waiting contacts shown adjacent thereto until connection is made with the waiting contacts of a trunk not already in use, when connecting-relay 19 is energized, resulting in the stopping of the motion of the wipers and in the connecting of the line conductors 14, 15 to the wipers 21, 22. The waiting contacts of the automatic switch in equipment 16 are connected to a plurality of trunks, each trunk being equipped with keys and signals, as shown in the lower portion of sheet L, and with an automatic selecting-switch, (designated as a whole 23 in Sheet R,) the trunk thus terminating in armature parts of relay 56 and being connected through armature-contacts to magnets 54 and 55 when the switch 23 is not in use. The trunk-conductors are two in number, (including respectively conductors 24, 117, 110, 63 and 25, 118, 111, 70) and they are multiplied through the waiting contacts of a plurality of automatic switches pertaining to line equipments, as 16, and an auxiliary conductor 26 also is multiplied through the waiting contacts of those automatic switches for purpose of busy test. Each trunk thus is accessible from a plurality of automatic switches, and each automatic switch has accessible a plurality of trunks.

The action of the line equipment 16 in selecting a trunk not already in use is as follows: Upon removal of the receiver from the hook at substation-telephone 10 current flows from battery 27 through conductors 28, 15, 11, 14, 29 and to ground, energizing relay 17 and attracting its armature. The energization of relay 17 gives path for current from battery through conductors 30, 31, 32, 33, 20, 34 and to ground, energizing actuating-relay 18, which propels wiper 20 into connection with waiting-test contacts of the trunk conductors 24, 25, and wipers 21, 22 into connection with said conductors 24, 25. The attraction of the armature of relay 18 has interrupted the circuit last described by breaking the connection between conductors 30 and 31; but this interruption has deënergized relay 18, and upon the release of its armature the previously described circuit is completed again as far as wiper 20. If at this time trunk conductors 24, 25 be already in use, a ground will be found upon test-conductor 26, and circuit will be completed for battery 27 over conductors 30, 31, 32, 33, 20, 26 and to ground, energizing relay 18 and stepping wipers 20, 21, 22 forward to the next trunk. This cycle of operation will repeat automatically, so long as wiper 20 finds a ground upon the test-conductor of the trunk connected with, but as soon as a trunk is found whose test-conductor, as 26, is not grounded, the circuit from the wiper 20 to ground will not exist, and current will flow from battery 27 over conductors 30, 31, 36, 35 and to ground. The resistance of relay 18 is low, and the number of turns of the conductor 30 upon relay 18 is comparatively small, while the relay 19 is of high resistance, and the number of turns of conductor 36 upon relay 19 is comparatively large. Furthermore, the spring tensions upon the armatures of those relays are capable of relative adjustment. In response to this current through relays 18 and 19 in series, the relay 18 is not sufficiently energized to attract its armatures or to break its armature-contact, while the relay 19 is energized to operate its armatures. Conductor 33 is removed from conductor 32 and placed in connection with conductor 37, thus placing a ground upon wiper 20 and upon test-conductor 26, and thus upon the multiplied test-contacts of the trunk conductors 24, 25, preventing the connection with that trunk of any telephone-line through its equipment, such as 16, and reserving that trunk exclusively for the use of telephone-line 14, 15 and the substation-telephone 10. The armatures of the relay 19 also have connected conductors 29 and 38 to wipers 21, 22, and therefore to conductors 24, 25. Current previously flowing from battery 27 to conductors 28, 15, 11, 14, 29 and to ground now flows through conductors 28, 15, 11, 14, 29, 22, 24, 39 and to ground without such interruption in changing as would affect relay 17. The energization of relays 17 and 19 therefore is continued and calling visual signal 40 is displayed before the operator using equipment 41, indicating to her that a calling patron has been connected to the trunk served by the signal 40. The circuit conditions now existing and which will remain unchanged throughout the further promotion and continuance of the connection give a current from the battery 27 through the speech transmission device of the substation 10 in series with the conductors forming winding of relay 17, between one side of the line and the ground-battery and the winding of visual signal 40, between the other side of the line and ground. The relative resistances and impedances of relay 17 and visual signal 40 shall be such as to maintain proper balance of the line conductors and to supply proper current for speech transmission from the substation 10 without unduly detracting from speech transmission to substation 10. Conductors 42, 43, 44 provide for calls in which substation 10 is the called station to the connection. Such conditions will be described later in this specification.

A trunk equipment consists of visual signals 40 and 45 and keys 46, 47, 48, 49, 50, 51, 52, 53, located in a switch-board accessible visually and manually to the operator using the equipment 41, also automatic switch 23, located in the same central office with the operator 41. The switch 23 is of a type having two directions of motion in its wipers, the first motion being controlled by actuating-magnet 54 and the second motion being controlled by actuating-magnet 55. By the first motion, as in the vertical steps of a Strowger switch, wipers move to a desired position, constituting by the selection of the position the selection of a group of trunks—*i. e.*, a group of sets of waiting contacts. By the second motion, controlled by magnet 55, the wipers are moved, as in the rotary motion of a Strowger switch, to select one set of contacts from the group of sets preliminarily selected. Magnet 56 is a connecting and releasing magnet, and magnets 55, 56 bear the same relation between themselves as do magnets 18, 19, described in connection with switch 16, as will be seen in the detailed description of the operation of switch 23 immediately following.

The automatic switch 23 may be of any preferred mechanical detail, one possible association of necessary parts being shown diagrammatically in Fig. 3.

In Fig. 3, 200 is a movable shaft sustaining the wipers 80, 81, 82. 201 is a cylindrical rack upon the shaft by which the wipers may be moved in the primary direction of selection. 202 is a cylindrical ratchet upon the shaft by which the wipers may be moved in the secondary direction of selection. 203 is a detent-pawl adapted to engage both the cylindrical rack and the cylindrical ratchet to hold the wipers in the determined position both in primary and secondary directions and to release the wipers from restraint in both directions of selection when it is withdrawn. 205 is a pin upon pawl 203. 204 is the pivot upon which pawl 203 moves and by which it is sustained. 206 is an armature for magnet 54. 207 is a driving-pawl pivoted upon armature 206. 208 is a fixed pin acting as guide for driving-pawl 207. 209 is an armature for magnet 55. 210 is a driving-pawl pivoted upon armature 209. 211 is a fixed pin acting as guide for driving-pawl 210. 212 is an armature for magnet 56. 213 is a link pivoted upon armature 212. 214 is a cam upon link 213, adapted to engage pin 205. 215 is a link connecting link 213 and armature 206. 73 is an off-normal switch. 216 is a flange upon shaft 200 in engagement with one of the springs of the pair 73, holding said pair separated and extending in such direction and for such distance that such engagement of the flange with one member of the pair continues throughout the motion of the wipers in the first or primary direction of selection and that the engagement is discontinued when the wipers make their first step in the secondary direction, at which time by the release of such engagement of the spring with the flange the contact between the two springs of the pair is permitted, and the off-normal switch 73 is closed. This switch detail is illustrated further in Fig. 4, which is taken at an angle of ninety degrees with Fig. 3, the shaft 200 and flange 216 being shown in section.

The operation of the automatic switch shown diagrammatically in Fig. 3 is as follows: By successive energizations of magnet 54, armature 206 is attracted successively and driving-pawl 207 acts upon successive teeth of the cylindrical rack, the rack being held in its determined position by detent-pawl 203. Then successive energizations of magnet 55 attract armature 209 successively, causing driving-pawl 210 to act upon successive teeth of cylindrical ratchet 202, turning it step by step in the direction indicated by the arrow, the cylindrical ratchet being held in its determined position by the detent-pawl 203. Then energization of magnet 56 attracts armature 212, thus advancing link 213 until cam 214 passes pin 205, which it is permitted to do by reason of the slotted connection between link 213 and link 215. Then upon deenergization of magnet 56, armature 212 is returned by spring tension to its position of rest, withdrawing link 213, causing cam 214 to engage pin 205, withdrawing detent-pawl 203, and releasing shaft 200 and wipers 80, 81, 82 to return to the normal position of rest by spring tension or gravity. Then upon the next energization of magnet 54 the movement of armature 206, acting through link 215, lifts link 213 to disengage cam 214 from pin 205 and release detent-pawl 203 for service, as above described.

The operation of the trunk equipment, as a whole, is as follows: By the action of automatic switch 16, consequent upon the closing of the circuit at substation 10, trunk conductors, as 24, 25 are selected and the signal 40 of that trunk is caused to be displayed by current from battery 27. There is no further change in the circuit conditions of elements 10, 16, or 40 until the termination of the conversation.

In response to the display of signal 40, operator at 41 presses key 46, which is adapted to remain in its depressed position until released by the hand of the operator. This places the operator at 41 in telephonic communication with the patron at the telephone 10. She asks for and receives his order. In the execution of the order she depresses key 47, which remains in its operated position until released by her hand, then depresses key 51, which remains in its operated position until released manually by key 50 or electromagnetically by magnet 57, then depresses key 49, which remains in its operated position until released manually by key 48 or electromagnetically by magnet 58, then controls and operates automatic selecting-switch 23 by the use of keys 52, 53.

By the operation of key 51, battery 59 has been connected by conductors 60, 61, 62 with trunk conductor 63, to which conductor battery 64 also is connected by conductors 65, 66, the latter containing the winding of magnet 54; but magnet 54 is not energized as the two batteries are equal in potential and opposing in polarity. By the operation of key 53, path is formed for current from grounded battery 64 over conductors 66, 63, 62, 67 and to ground, energizing magnet 54 successively for each operation of the key 53, thus accomplishing the first selective movement of the automatic switch 23 and selecting the desired group of trunks or sets of waiting contacts. Having thus selected the group, key 52 is depressed once by the operator, giving path for current from grounded battery 64 over conductors 65, 68, 69, 70, 71, 72 and to ground, energizing magnet 55 and moving the wipers one step in their second direction.

Switch 73 now becomes effective, its construction being such that the two parts have a normal tendency to close together, but one part being engaged with a projection of the wiper-carriage or moving part of the automatic switch 23, the engagement being mechanically such that the two parts of switch 73 are held out of connection during such time as the wiper-carriage is in its normal position with reference to its second motion of selection regardless of its position with reference to the first motion of selection, as heretofore explained in connection with Figs. 3 and 4. Switches of this nature are well known in the art both in function and construction, and the name "off-normal" is applied to them.

The energization of magnet 55 has stepped the wipers forward into engagement with the first set of the waiting contacts of the selected group, and if wiper 80 finds a ground upon the waiting contact connected with, circuit will be closed for current from battery 64 over conductors 65, 68, 74, 75, 79, 80, 83, 84 and to ground, resulting in the reënergization of magnet 55 upon the releasing of its vibrating armature, and thus the vibration will continue until a waiting contact not grounded is engaged by wiper 80, at which time, conductor 79 being open, current will flow from battery 64 over conductors 65, 68, 74, 75, 76, 73, 77, 78 and to ground.

As mentioned, the relation of relay 56 to magnet 55 corresponds to that of relay 19 to magnet 18, and therefore relay 56 is energized and magnet 55 is not energized. Consequent upon the energization of relay 56, conductor 79 is removed from conductor 75 and connected with conductor 85, thus grounding conductor 84 and its multiplied waiting contacts and placing busy test upon the selected trunk or line. Also by the energization of relay 56, conductor 63 is removed from conductor 66 and connected to wiper 82, and conductor 70 is removed from conductor 69 and connected to wiper 81. Conductors 69, 66 are thus isolated, and further operation of magnets 54, 55 is impossible so long as the energization of relay 56 continues by current through key 47. Conductors 63, 70 now are connected through wipers 82, 81 to trunk conductors 87, 86, and thus to the modified Strowger switch (indicated as a whole as 88.) The mechanical construction of this switch is well known in the art and is diagrammatically shown in Fig. 5, wherein 300 is the shaft bearing the insulated wipers 100, 101, 102. 301 is the cylindrical rack for vertical or primary selection. 302 is the cylindrical ratchet for rotary or secondary selection. 303 is the detent-pawl for operating upon both the cylindrical rack and cylindrical ratchet. 304 is the pivot of detent-pawl 303. 305 is a pin upon detent-pawl 303, by which pawl 303 is withdrawn from engagement with the rack and ratchet for disconnection of the wipers and restoration of the shaft 300. 306 is the armature of the vertical magnet 92. 307 is the driving-pawl, pivoted upon the armature 306. 308 is a fixed pin acting as a guide for the driving-pawl 307. 309 is the armature of horizontal magnet 125. 310 is the driving-pawl, pivoted upon the armature 309. 311 is a fixed pin acting as guide to the driving-pawl 310. 312 is the armature of the release magnet 108. 313 is a link pivoted upon the armature 312 and adapted by its hook form to engage pin 305 and withdraw pawl 303 when magnet 108 is energized. 121 is an off-normal switch closed by the first vertical movement of the shaft 300. 317 is a side switch or auxiliary switch or pilot-switch designed to be propelled by control of private magnet 94. 318 is the armature of the private magnet 94. 319 is a driving-pawl pivoted upon the armature 318. 320 is a fixed pin acting as a guide to driving-pawl 319. Driving-pawl 139 is adapted to pass one tooth of the part 317 when the armature 318 is attracted and to move the part 317 by pulling the tooth thus passed when armature 318 returns to its position of rest by spring tension after being released magnetically. 95, 96, 97 are insulated wipers upon the side switch part 317. The private magnet also actuates an armature-contact 94[a]. It is seen that by the first action of the private magnet 94, the wipers 95, 96, 97 will be advanced to their middle positions, while by the second action of the private magnet they will be advanced to their third or last positions, after which no further advancement is possible. 316 is a collar upon the shaft 300, adapted to operate the off-normal switch 121 and also to restore the side switch pawl 317 to its normal position of rest upon the return of the shaft 300 to its normal position of rest upon disconnection when released by the detent-pawl 303. Wipers 95, 96, 97 are so spaced upon the side switch that wiper 97 lags behind the other two wipers both in leaving the contact-points immediately after the starting of the side switch under the pull of pawl 319 and in making connection with the next contact-point just before the side switch reaches the limit of its step.

By another series of actuations, key 53 controls switch 88 over the circuit from grounded battery 89 over conductors 90, 91, 87, 82, 63, 62, 67 and to ground, thus energizing the vertical magnet 92 successively and selecting the desired level of waiting contacts. Then by the operation of key 52, current is taken from battery 89 over conductors 90, 93, 86, 81, 70, 71, 72 and to ground, energizing and releasing the private magnet 94 and stepping the side switch-wipers 95, 96, 97 forward one step in the well-known manner.

By another series of operations of the key 53, switch 88 is controlled by a circuit from grounded battery 89 over conductors 90, 98, 95, 87, 82, 63, 62, 67 and to ground, stepping the wipers 100, 101, 102 forward into contact with the selected telephone-line by energization of rotary-magnet 125.

If the line thus selected be busy, it will have the condition of busy test—namely, a ground upon the terminal connected with by private wiper 102. Then the actuation of key 52, subsequent to the last selective group of actuations of key 23, will energize private magnet 94. Thereupon, a path for current will be provided from battery 89 over conductors 90, 99, 103, 104, 94[a], 97, 105, 102, 106, 107 and to ground, energizing release magnet 108 and restoring the wiper-carriage to its normal position of rest. Thus restoration will occur without the magnetic release of key 51, which is provided for in the next paragraph.

If the line selected be not busy, then the actuation of key 52 subsequent to the last selective group of actuations of key 53 will energize and release private magnet 94, and thus step the side switch-wipers 95, 96, 97 forward into their right-hand position. In the motion of the side-switch wipers from the middle to the right-hand position, the sequence of the breakings and makings of connections is as follows: First, wipers, 95, 96 break from conductors 98, 93, respectively; second, wiper 97 breaks from conductor 104; third, wipers 95, 96 make contact with conductors leading to wipers 101, 100, respectively, and thus circuit is completed for current from grounded battery 59 over conductors 60, 61, 62, 63, 82, 87, 95, 101, 43′, 29′ and to ground, energizing magnet 57 and releasing key 51. The release of the key 51 immediately succeeding the last actuation of the key 52 indicates to the operator that the line selected has been connected with. Fourth, wiper 97 makes contact with conductor 109, thus connecting the ground of 109 through 97, 102, 106 to 107 and its multiplied waiting contacts, placing busy test conditions upon the selected line. By contact of wiper 97 with conductor 109, path is formed for current from grounded battery 27′ over conductors 30′, 31′, 36′, 42′, 106, 102, 105, 97, 109 and to ground, energizing relay 19′, but not energizing relay 18′. The energization of relay 19′ removes the ground from conductor 29′ and connects conductors 29′, 38′ to wipers 22′, 21′, these wipers being out of connection with any waiting contacts. The connection of conductor 33′ also is changed from conductor 32′ to conductor 37′. By the automatic release of key 51, path is given for ringing current from ringing-generator 115 over conductors 113, 111, 70, 81, 86, 96, 100, 44′, 116′, 15′, 43′, 101, 95, 87, 82, 63, 110, 112 and to ground. From junction-point 116′ a branch circuit exists over conductor 28′ and through battery 27′ to ground. The current flowing over this branch path is not designed to actuate the armature of relay 17′, since relay 17′ is of considerable impedance and is designed to be energized by continuous current; but such actuation would not in any way affect the operation of the circuits shown, since the armature would but place ground upon conductors 35′ and 34′, both of which are already grounded, the former through 42′, 106, 102, 105, 97, 109 and the latter through 20′, 33′, 37′. Owing to the high resistance of element 13′ in the main ringing-circuit traced above, magnet 58 does not receive sufficient current to energize it to the degree required to attract its armature. The signal-bell 13′ is actuated by the current flowing through it. In response to this signal, the patron at substation 10′ lifts the receiver from the hook, and thus substitutes the low resistance of conductor 11′ for the high resistance of elements 12′ and 13′, formerly connecting conductors 15′ and 14′. This reduction of the resistance of the main ringing-circuit traced above results in an increase of the volume of current flowing through that circuit, and therefore results in a greater energization of magnet 58. Magnet 58 attracts its armature, and therefore releases key 49, indicating to the telephone operator that the called station has answered, and also connecting the called line through to the calling-line by connection between conductors 110, 111 and conductors 117, 118. Path is furnished also for current from grounded battery 27′ over conductor 28′, 15′, 11′, 14′, 43′, 101, 95, 87, 82, 63, 110, 117, 119 and to ground, energizing relay 17′ without consequent effect and energizing visual signal 45. Current will continue to flow through this path without change throughout the duration of the conversation, furnish energy for speech transmission from station 10′ and cause signal 45 to remain displayed before the operator.

If key 51 had not released automatically immediately upon the last actuation of selective key 52, the operator would understand that the line selected had been found busy and would so report by telephone to the calling patron. If within a reasonable time the ringing-key 49 had not been released automatically and signal 45 had not been displayed, the operator would understand that the called party had not answered and would report to the calling patron that the called party had been rung for a reasonable length of time without response. In the case of the failure of the release automatically of either or both of the keys 49, 51, the operator is provided with means, such as 50 and 48, to release those keys.

Signals 40 and 45 associated together and both displayed indicate to the operator that the conversation is in satisfactory progress.

Before proceeding with a consideration of the conditions of disconnection, it will be noted that in the selection of the trunk 83, 86, 87 by the switch 23 and the consequent energization of relay 56 the grounded conductor 85 was connected to trunk conductor 83 and furnished path for current from battery 89 over conductors 90, 99, 83, 80, 79, 85 and to ground, energizing relay 120, the winding of which forms a portion of conductor 83. This relay during its energization breaks connection between conductors 122 and 123.

Electric switch 121 is an off-normal switch similar in all respects to the off-normal switch 73 of automatic switch 23, but closed by the first vertical step of the modified Strowger switch 88, as previously explained.

The release-magnet 108 differs from the switching and release magnet 56 in its mechanical relation to the switch 88. The release-magnet 108 is adapted to restore switch 88 upon energization and not consequent upon deënergization.

We now will pass to the consideration of the disruption of the connection set up and the consequent restoration to normal of all parts used.

By hanging the receiver upon the hook at substation 10′, direct current previously flowing through conductors 11′ and 119 is interrupted and signal 45 is released. By hanging receiver upon the hook at substation 10, current flowing through conductors 11 and 39 is interrupted and signal 40 is released.

The breaking of circuit for direct current through substation 10 has deënergized relay 17 and, by release of the armature of that relay, has interrupted current through relay 19, by the deënergization of which the mechanisms associated with its armature have effected the restoration of switch 16 as a whole to its position of rest. Upon the release of the signals 40 and 45, the operator will manually release the key 47, disconnecting conductor 77 from conductor 78 and interrupting the current previously flowing to ground at 78 from battery 64 over conductors 65, 68, 74, 75, 76, 73, 77, 78, and which has maintained the energization of relay 56. By the interruption of that circuit and the release of the armatures of relay 56, the mechanisms associated with those armatures have effected the restoration to normal of the switch 23 as a whole.

By the restoration of the switch 23 ground conductor 85 has been disconnected from conductor 83 and the circuit through relay 120 is interrupted, thus releasing its armature and closing its circuit for current from battery 89 over conductors 90, 99, 103, 121, 122, 123 and to ground, energizing release magnet 108 and restoring connector 88 as a whole to its normal position of rest, including in such restoration the interruption of said restoring-circuit by the opening of this switch 121.

The restoration of the switch 88 to normal has disconnected ground conductor 109 from conductor 106, and the breaking of the circuit through conductor 11′ had previously interrupted the circuit through conductor 28′ and deënergized relay 17′, releasing its armature. Thus all grounds are removed from conductor 42′ and circuit is interrupted formerly giving current through conductor 36′. Relay 19′, therefore, is deënergized and switch 16′ as a whole is restored to its normal position of rest.

The hanging up of the two receivers at the substation-telephones in connection thus automatically has signaled the operator at 41, who by release of her key 47 in conjunction with the hanging up of the receivers has restored all parts to a normal position of rest in readiness for a succeeding call involving any or all of them.

I do not wish to limit myself in all respects in the interpretation of my invention to the particular devices or circuits herein shown, as many variations may be made without departing from the spirit or scope of my invention. For instance, no indication is given, either in the drawings or in this written description, indicating the relative locations of the equipments 16, 23, 88, and 16′. Thus the figures shown are applicable to an installation in which all of these parts are placed in the same central office or to one in which the different parts are distributed in any desired manner among a plurality of central offices, the length of the connecting trunk conductors, as 24 25, 63 70 77, 83 86 87, 42′ 43′ 44′, not being a limiting factor in the operation of the system as applied to exchange areas of present commercial size.

In the description herein given, an exchange district is considered involuing directory numbers of three digits and in which one digit is cared for by switch 23 and the remaining two by switch 88. In an exchange district involving directory numbers of but two digits, switch 23 may be dispensed with. In an exchange district involving directory numbers of four digits, an additional switch 23 would be required intervening between the switch 23 shown and the switch 88, and in larger exchange districts a greater number of switches 23 would be required, and these might be all in one central office or distributed through many central offices.

A single automatic calling device may be substituted for keys 53 and 52. As key 51 connects those selecting keys to the trunk under actuation and disconnects them upon release, but one such automatic device would be necessary for each operator. This modification is shown in Fig. 6, the mechanism of the well-known Strowger device being indicated in connection electrically with the key 51 and associated circuits of Fig. 1, the necessary circuits of the Strowger calling-device itself being shown in dotted lines.

Any form of inductive link may be substituted for the condensers 124.

In the drawings, I have shown grounded batteries 27, 59, 64, 89, 27′, all of which are of the same potential and polarity. As many of these batteries as are placed in the same central office may be combined, or, in other words, one battery may be used in each central office and all conductors taken to it.

Many other variations are possible without departing from the spirit of my invention.

What I claim, therefore, and what I desire to secure by United States Letters Patent, is—

1. In a telephone system, the combination of a substation-telephone, a central office, a trunk-selecting switch in said central office, a line connecting said substation-telephone with said trunk-connecting switch, speech-transmitting elements forming a part of said substation-telephone and adapted to receive electrical energy for speech transmission from said connecting telephone-line, a source of electrical potential in said central office, a relay in said central office and connected to said line, a trunk in said central office, a visual signal, and a circuit including said source of potential, said relay, said line, said speech-transmitting elements, a conductor in said trunk and said visual signal, substantially as described.

2. In a telephone system, the combination of a substation-telephone, a central office, an automatic switch in said central office, a grounded source of electric energy in said central office, a relay in said central office, a telephone-line extending between said substation-telephone and said central office; a switch-controlling circuit extending from ground through said source of energy, said relay, a limb of said line, the speech-transmitting elements of said substation-telephone, the remaining limb of said line and to ground; a trunk; a visual signal; and a supervisory circuit extending from ground through said source of energy, said relay, the limbs of said line, the speech-transmitting elements of said substation-telephone, a conductor of said trunk, said visual signal and to ground; said first-mentioned circuit and said second-mentioned circuit being effective alternatively, substantially as described.

3. In a telephone system, the combination of a substation-telephone, a central office, a line connecting said substation-telephone with said central office and comprising two limbs, a relay having an inductive winding in said central office, a source of electrical potential in said central office, speech-transmitting elements at said substation connected between the limbs of said line, a trunk, a signal device associated with said trunk and having an inductive winding balancing inductively the inductive winding of said relay; means for connecting said line and said trunk, and a circuit including said source of potential, said relay, the two limbs of said line, said speech-transmitting elements and said signal device, substantially as described.

4. In a telephone system, the combination of an automatic switch adapted to connect a telephone-line to a selected trunk, a telephone-substation, a telephone-line connecting said substation-telephone with said automatic switch, a relay associated with said automatic switch, a source of electrical potential, a circuit extending from ground through said source of electrical potential and the windings of said relay to one of the limbs of said line, a selected trunk, a signal device associated with said trunk, a circuit extending from ground through the winding of said signal device and a conductor of said trunk, and through the selecting contacts of said automatic switch to the other limb of said telephone-line and speech-transmitting elements forming a part of said substation-telephone and connected between the two limbs of said line, substantially as described.

5. In a telephone system, the combination of a substation-telephone, a central office, a relay having an inductive winding in said central office and associated with said line, a source of electrical potential in said central office, a plurality of trunks in said central office, means for connecting said telephone line with a selected one of said trunks, a visual signal having an inductive winding and associated with said selected trunk, and a circuit comprising said source of potential, said inductive winding of said relay, said telephone line, the speech-transmitting elements of said telephone, a conductor of said trunk, and said inductive winding of said signal device, substantially as described.

6. In a telephone system, the combination of a substation 10, a line 14—15 connecting said substation to a central office, an automatic switch 16 in said central office, a trunk 24—25 leading from said automatic switch to an operator, an operator's equipment 41 adapted to be associated with said trunk, an automatic switch 88 adapted to be associated with said trunk, keys forming a part of said operator's equipment and adapted to control said automatic switch 88 when it is associated with said trunk, and a plurality of lines as 14′—15′ selectively accessible to said automatic switch 88, substantially as described.

7. In a telephone system, the combination of a substation 10, a line 14—15 connecting said substation with a central office, a trunk in said central office, an automatic switch 16 adapted to connect said line with said trunk, an operator's equipment, keys forming a part of said operator's equipment and associated with said trunk, an automatic switch 23 associated with said trunk and adapted to be controlled by said keys, an automatic switch 88 adapted to be associated with said trunk and adapted to be controlled by said keys when so associated, and a plurality of lines as 14′—15′ selectively accessible to said automatic switch 88, substantially as described.

8. In a telephone system, the combination of a substation-telephone 10, a line 14—15 connecting said substation-telephone to an automatic switch 16, an automatic switch 16 adapted to connect said telephone-line to a trunk, a trunk, a first circuit including source of electric potential, the speech-transmitting elements of said substation-telephone, said line, said automatic switch 16, and a portion of said trunk; an automatic switch 88 controlled manually by a central office operator, a selected telephone-line 14′—15′, a substation-telephone 10′ on said selected telephone-line, a second circuit including a source of electric potential, the speech-transmitting elements of said substation-telephone 10′, said selected telephone-line, said automatic switch 88, and the remaining portion of said trunk; and an inductive link connecting together said first circuit and said second circuit for speech transmission between the two said substation-telephones, substantially as described.

9. In a telephone system, the combination of a substation-telephone, a central office, a line connecting said substation with said central office, speech-transmitting elements forming a part of said substation-telephone adapted to transmit speech by energy received over said telephone-line, an automatic switch in said central office connected to said line and adapted to connect said line with a trunk leading to an operator's equipment, the trunk, an automatic switch connected with said trunk and adapted to said operator's control and adapted to connect said trunk to a selected line, a substation on said selected line, speech-transmitting elements in said latter substation adapted to transmit speech by energy received over said selected line, a circuit including a central-office source of electrical potential and said speech-transmitting elements of said first substation, an independent circuit including a source of electrical potential in said central office and the speech-transmitting elements of said latter substation-telephone, and an inductive link connecting said circuits adapted to transmit alternating currents between said circuits, substantially as described.

10. In a telephone system, the combination of a substation-telephone, a central office, a line connecting said telephone and said central office, trunk-lines wholly within said central office and adapted at one end to be selected by a telephone-line and at the other end to select a telephone-line, an automatic switch connected to said telephone-line for selecting an idle one of said trunks, keys connected with said selected trunk for controlling its selecting end, and visual signals connected to said selected trunk and adapted to be controlled by substation-telephones connected to said trunk, substantially as described.

11. In a telephone system, the combination of a substation-telephone, a central office, a line connecting said telephone and said central office, trunks within said central office, an automatic switch associated with said line and adapted to connect said line selectively with an idle one of said trunks, a visual signal associated with said selected trunk and adapted to be displayed when said trunk is connected with, an operator's telephone, a key for connecting said operator's telephone with said trunk, means associated with said trunk for connecting with a selected one of a plurality of telephone-lines, a key associated with said trunk having electro-magnetic release and adapted to be released consequent upon connection with a selected telephone-line, another key associated with said trunk adapted to connect a source of ringing energy to said selected line and having electro-magnetic release adapted to release said key upon the answering of a substation-telephone upon said selected telephone-line, and a visual signal associated with said trunk adapted to be displayed while the receiver is off the hook at a substation-telephone upon said selected telephone-line, consequent to the release of said keys, substantially as described.

12. In a telephone system, the combination of a substation-telephone, a central office, a line connecting said telephone and said central office, trunks within said central office, an automatic switch associated with said line, and adapted to connect selectively with an idle one of said trunks, a visual signal associated with said selected trunk, and adapted to be displayed when said trunk is connected with, an operator's telephone equipment, a key for connecting said operator's telephone with said trunk, means associated with said trunk for connecting with a selected one of a plurality of telephone-lines, a key associated with said trunk having electro-magnetic release and adapted to be released consequent upon connection with a selected telephone-line, and a visual signal associated with said trunk adapted to be displayed while the receiver is off the hook, at a substation-telephone upon said selected telephone line, substantially as described.

13. In a telephone system, the combination of a substation-telephone, a central office, a line connecting said telephone and said central office, trunks in said central office, an automatic switch associated with said line and adapted to connect said line selectively with an idle one of said trunks, a relay controlling said automatic switch, a source of electric potential in said central office, speech-transmitting elements in said substation adapted to transmit speech by energy received over said line, a visual signal associated with said selected trunk, a circuit including said source of potential, said relay, said line, said speech-transmitting elements, and said signal, an operator's telephone, keys for connecting said operator's telephone with said trunk, an automatic switch associated with said trunk for selecting a telephone-line, a selected telephone-line, a substation-telephone upon said selected line, speech-transmitting elements in said latter substation-telephone adapted to transmit speech by energy received over said line, keys associated with said trunk for controlling said latter automatic switch, a key associated with said trunk for impressing ringing energy upon said selected telephone-line, a key associated with said trunk, for maintaining connection between said trunk and a selected telephone-line and for disrupting said connection, another visual signal associated with said trunk, a second circuit including said source of potential, said selected line, the speech-transmitting elements of said latter substation-telephone and said other visual signal, and an inductive link connecting said first circuit with said second circuit, substantially as described.

14. In a telephone system, the combination of a substation-telephone, a central office, a line connecting said telephone with said central office, a relay in said central office, a visual signal in said central office, automatic switch in said central office, and a circuit including a central office source of electrical potential, said relay, said line, said telephone, circuit-conductors passing through said automatic switch, and said visual signal, substantially as described.

15. In a telephone system, the combination of a substation telephone, a central office, a line connecting said telephone with said central office, speech-transmitting elements in said substation-telephone adapted to transmit speech by energy received over said line, a relay in said central office, a visual signal in said central office, automatic switch in said central office, and a circuit including a central-office source of electrical potential, said relay, said line, said speech-transmitting elements of said telephone, circuit-conductors passing through said automatic switch, and said visual signal, substantially as described.

16. A telephone exchange system comprising a plurality of telephone lines and means for interconnecting calling and called lines for conversation including a trunk line extending through an operator's position, electromagnetically actuated selecting and connecting switch mechanism for connecting said trunk line in circuit with a desired called line, means under the control of the operator for transmitting directive currents to actuate said mechanism, a source of ringing current with connections for automatically applying the same to the called line if idle, and a signal whereby the operator may be advised of such application automatically controlled thereby.

17. A telephone exchange system comprising a plurality of telephone lines and means for interconnecting calling and called lines for conversation including a trunk line extending through an operator's position, electromagnetically actuated selecting and connecting switch mechanism for connecting said trunk line in circuit with a desired called line and means under the control of the operator for transmitting directive currents to actuate said mechanism.

18. A telephone exchange system comprising a plurality of telephone lines, call signals at the exchange, means under the control of a calling subscriber for causing the display of the associated call signal, and means for connecting calling and called lines for conversation including a trunk line extending through an operator's position and automatic selecting and connecting switch mechanism under the control of the operator for connecting said trunk line in circuit with a desired called line.

19. A telephone exchange system comprising a plurality of telephone lines, call signals at the exchange, means under the control of a calling subscriber for causing the display of the associated call signal and means for connecting calling and called lines for conversation including a trunk line extending through an operator's position, electromagnetically actuated selecting and connecting switch mechanism for connecting said trunk in circuit with a desired called line and means under the control of the operator for transmitting directive currents to actuate said mechanism.

20. A telephone exchange system comprising a plurality of telephone lines and means for interconnecting calling and called lines for conversation including a trunk line extending through an operator's position, automatic selecting and connecting switch mechanism under the control of a calling party for connecting his line to one end of said trunk line, and automatic selecting and connecting switch mechanism under the control of the operator for connecting the other end of said trunk line to a desired called line.

21. A telephone exchange system comprising a plurality of telephone lines and means for interconnecting calling and called lines for conversation including a trunk line extending through an operator's position, automatic selecting and connecting switch mechanism under the control of a calling party for connecting his line to one end of said trunk line, electromagnetically actuated selecting and connecting switch mechanism for connecting the other end of said trunk line to a desired called line and means under the control of the operator for transmitting directive currents to actuate said electromagnetically actuated mechanism.

22. A telephone exchange system comprising a plurality of telephone lines and means for interconnecting calling and called lines for conversation including a trunk line extending through an operator's position at the exchange, automatic selecting and connecting switch mechanism under the control of a calling party for connecting his line to one end of such trunk line, a call signal displayed upon the establishment of such connection, and automatic selecting and connecting switch mechanism under the control of the operator for connecting the other end of such trunk line to a desired called line.

23. A telephone exchange system comprising a plurality of telephone lines and means for interconnecting calling and called lines for conversation including a trunk line extending through an operator's position at the exchange, automatic selecting and connecting switch mechanism under the control of a calling party for connecting his line to one end of such trunk line, a call signal displayed upon the establishment of such connection, electromagnetically actuated selecting and connecting switch mechanism for connecting the other end of such trunk line to a desired called line and means under the control of the operator for transmitting directive currents to actuate such mechanism.

24. A telephone exchange system comprising a plurality of telephone lines and means for interconnecting calling and called lines for conversation including a plurality of trunk lines extending through an operator's position at the exchange, automatic selecting and connecting switch mechanism under the control of a calling party for selecting and establishing connection between a calling line and one end of an idle one of said trunk lines, and automatic selecting and connecting switch mechanism under the control of the operator for connecting the other end of the selected trunk line to a desired called line.

25. A telephone exchange system comprising a plurality of telephone lines and means for interconnecting calling and called lines for conversation including a plurality of trunk lines extending through an operator's position at the exchange, automatic selecting and connecting switch mechanism under the control of a calling party for selecting and establishing connection between the calling line and one end of an idle one of said trunk lines, electromagnetically actuated selecting and connecting switch mechanism for connecting the other end of the selected trunk line to the desired called line and means under the control of the operator for transmitting directive currents to actuate said electromagnetically actuated mechanism.

26. A telephone exchange system comprising a plurality of telephone lines and means for interconnecting calling and called lines for conversation including a plurality of trunk lines extending through an operator's position at the exchange, automatic selecting and connecting switch mechanism under the control of a calling party for selecting and establishing connection between the calling line and one end of an idle one of said trunk lines, a call signal displayed upon the establishment of such connection and automatic selecting and connecting switch mechanism under the control of the operator for connecting the other end of the selected trunk line to a desired called line.

27. A telephone exchange system comprising a plurality of telephone lines and means for interconnecting calling and called lines for conversation including a plurality of trunk lines extending through an operator's position at the exchange, automatic selecting and connecting switch mechanism under the control of a calling party for selecting and establishing connection between the calling line and one end of an idle one of said trunk lines, a call signal displayed upon the establishment of such connection, electromagnetically actuated selecting and connecting switch mechanism for connecting the other end of the selected trunk line to a desired line and means under the control of the operator for transmitting directive currents to actuate such electromagnetically actuated mechanism.

28. A telephone exchange system comprising a plurality of telephone lines and means for interconnecting calling and called lines for conversation including a trunk line extending through an operator's position, electromagnetically actuated selecting and connecting switch mechanism for connecting said trunk line in circuit with a desired called line, means under the control of the operator for transmitting directive currents to actuate said mechanism, and means for indicating to the operator the busy condition of a selected line.

29. A telephone exchange system comprising a plurality of telephone lines and means for interconnecting calling and called lines for conversation including a trunk line extending through an operator's position, electromagnetically actuated selecting and connecting switch mechanism for connecting said trunk line in circuit with a desired called line, means under the control of the operator for transmitting directive currents to actuate said mechanism, and means under the control of the operator for restoring said mechanism to normal.

30. A telephone exchange system comprising a plurality of telephone lines and means for interconnecting calling and called lines for conversation including a trunk line extending through an operator's position, electromagnetically actuated selecting and connecting switch mechanism for connecting said trunk line in circuit with a desired called line, means under the control of the operator for transmitting directive currents to actuate said mechanism, and means for indicating to the operator the response of the called party.

31. A telephone exchange system comprising a plurality of telephone lines and means for interconnecting calling and called lines for conversation including a trunk line extending through an operator's position, electromagnetically actuated selecting and connecting switch mechanism for connecting said trunk line in circuit with a desired called line, means under the control of the operator for transmitting directive currents to actuate said mechanism, and means for signaling the operator at the end of conversation.

32. A telephone exchange system comprising a plurality of telephone lines and means for interconnecting calling and called lines for conversation including a trunk line extending through an operator's position, automatic selecting and connecting switch mechanism under the control of the calling party for connecting his line to one end of said trunk line, electromagnetically actuated selecting and connecting switch mechanism for connecting the other end of said trunk line to a desired called line, means under the control of the operator for transmitting directive currents to actuate said electromagnetically actuated mechanism, and means for indicating to the operator the busy condition of a selected called line.

33. A telephone exchange system comprising a plurality of telephone lines and means for interconnecting calling and called lines for conversation including a trunk line extending through an operator's position, automatic selecting and connecting switch mechanism under the control of the calling party for connecting his line to one end of said trunk line, electromagnetically actuated selecting and connecting switch mechanism for connecting the other end of said trunk line to a desired called line, means under the control of the operator for transmitting directive currents to actuate said electromagnetically actuated mechanism, and means under the control of the operator for restoring said electromagnetically actuated mechanism to normal.

34. A telephone exchange system comprising a plurality of telephone lines and means for interconnecting calling and called lines for conversation including a trunk line extending through an operator's position, automatic selecting and connecting switch mechanism under the control of the calling party for connecting his line to one end of said trunk line, electromagnetically actuated selecting and connecting switch mechanism for connecting the other end of said trunk line to a desired called line, means under the control of the operator for transmitting directive currents to actuate said electromagnetically actuated mechanism, and means for indicating to the operator the response of a called party.

35. A telephone exchange system comprising a plurality of telephone lines and means for interconnecting calling and called lines for conversation including a trunk line extending through an operator's position, automatic selecting and connecting switch mechanism under the control of the calling party for connecting his line to one end of said trunk line, electromagnetically actuated selecting and connecting switch mechanism for connecting the other end of said trunk line to a desired called line, means under the control of the operator for transmitting directive currents to actuate said electromagnetically actuated mechanism, and means for signaling the operator at the end of the conversation.

36. A telephone exchange system comprising a plurality of telephone lines, means for establishing connection for conversation between calling and called lines consisting of interconnecting trunks and electromagnetically actuated switches for linking said trunks and lines together without manually established connections, means whereby a party desiring connection with another may communicate his order to an operator, and means under the control of the operator for transmitting directive currents to operate one or more of said switches.

37. A telephone exchange system comprising a plurality of telephone lines, means for establishing connection for conversation between calling and called lines consisting of interconnecting trunks and electromagnetically actuated switches for linking said trunks and lines together without manually established connections, means whereby a party desiring connection with another may communicate his order to an operator, means under the control of the operator for transmitting directive currents to operate one or more of said switches, and means under the control of the operator for restoring the parts to normal at the end of conversation.

38. A telephone exchange system comprising a plurality of telephone lines, means for establishing connection for conversation between calling and called lines consisting of interconnecting trunks and electromagnetically actuated switches for linking said trunks and lines together without manually established connections, means under the control of a calling party for transmitting current to actuate certain of said switches, means whereby the calling party may communicate his order to an operator, and means under the control of the operator for transmitting directive currents to the remaining switches necessary to establish the desired connection.

39. A telephone exchange system comprising a plurality of telephone lines, means for establishing connection for conversation between calling and called lines consisting of interconnecting trunks and electromagnetically actuated switches for linking said trunks and lines together without manually established connections, means under the control of a calling party for transmitting current to actuate certain of said switches, means whereby the calling party may communicate his order to an operator, means under the control of the operator for transmitting directive currents to the remaining switches necessary to establish the desired connection, and means under the control of the operator for restoring the parts to normal at the end of conversation.

40. A telephone system comprising telephone lines, a link-circuit at the exchange normally terminating in a contact adapted for interchangeable connection with calling lines, selective switching mechanism at the other end of said link-circuit and in normal selective operative relation therewith, and an operator's switching station on said link-circuit located intermediate of said terminal and said selective switching mechanism and provided with mechanism for exercising directive electromagnetic control over mechanism at said other end of said link-circuit.

41. A telephone system including telephone lines, a link-circuit at the exchange normally terminating in a contact adapted for interchangeable connection with calling lines, selective switch mechanism responsive to substation control to establish such connection, selective switch mechanism associated with the distant end of said link-circuit and in normal selective operative relation with said link-circuit, and an operator's switching station connecting with said link-circuit at a point intermediate of said terminal and said selective switching mechanism and provided with mechanism for exercising directive electromagnetic control over mechanism at said distant end to connect said link-circuit with a called line.

42. A telephone system including telephone lines, a link-circuit connected at its answering end with a calling line, selective switching mechanism at the other end of said link-circuit in normal selective relation therewith, a switching station at an intermediate point of said link-circuit with operator's mechanism for exercising directive electrical control over said selective mechanism to extend the calling line to a called line, and means including a switch at the calling substation for disconnecting said link-circuit and calling line at the will of the subscriber.

43. A telephone system comprising telephone lines, a link-circuit at the exchange having selective switching mechanism normally in operative selective relation with its two ends, a switch at a calling substation, means responsive thereto to operate the mechanism at one end to establish connection between said link-circuit and the calling line, and a switching station on said link-circuit including operator's means to electrically adjust mechanism at the other end of said circuit to complete a connection to a called line.

44. A telephone system comprising telephone lines, a link-circuit at the exchange having selective switching mechanism normally in operative selective relation with its two ends, a switch at a calling substation, means responsive thereto to operate the mechanism at one end to establish connection between said link-circuit and the calling line, a switching station on said link-circuit including operator's means to electrically adjust mechanism at the other end of said circuit to complete a connection to a called line, means controlled by a subscriber for releasing one line included in a connection, and means controlled by the operator for releasing the other line.

45. A telephone system comprising telephone lines, a link-circuit at the exchange having selective switching mechanism normally in operative selective relation with its two ends, a switch at a calling substation, means responsive thereto to operate the mechanism at one end to establish connection between said link-circuit and the calling line, a switching station on said link-circuit including operator's means to electrically adjust mechanism at the other end of said circuit to complete a connection to a called line, and release mechanism for disrupting an established connection controlled in part by a subscriber and in part by the operator.

46. A telephone system including telephone lines, a plurality of link-circuits, selective switches associated with the calling ends of said circuits, an operator's switching station on said link-circuits including a manually actuated device for exercising directive electrical control over said switches to extend said circuits to connections with particular lines, an operator's switch for each link-circuit serving when actuated to connect said device with its circuit, and means automatically effective on connection made with the called line to disconnect said device and signal the operator.

47. In a telephone system, the combination with a plurality of trunk lines, of a calling device, manually operated means for interchangeably connecting said device with trunk lines to be actuated, and apparatus for automatically freeing said device from a connected trunk effective on completed operation of the device.

48. In a telephone system, the combination with a plurality of trunk lines, of a calling device, means for interchangeably connecting said device with trunk lines to be actuated, apparatus for automatically disconnecting said device from a connected trunk, and means for notifying the operator of such disconnection.

49. In a telephone system, the combination with a plurality of trunk lines, of a calling device, means for interchangeably connecting said device with trunk lines to be actuated, apparatus for automatically disconnecting said device from a connected trunk, and a visual signal whereby an operator may know the connected or disconnected condition of said device.

50. A telephone system comprising telephone lines, link-circuits at the exchange having automatically controlled selective switch mechanisms at both their ends and in normal selective relation with said circuits, means responsive to a substation switch of a calling line serving to actuate mechanism at one end of a circuit to establish connection between such line and an idle link-circuit, an operator's switching station comprising means for learning the want of the calling subscriber and for transmitting directive currents to the mechanism at the distant end of the connected link to complete the wanted connection.

51. A telephone system comprising telephone lines, link-circuits at the exchange having automatically controlled selective switch mechanisms at both their ends and in normal selective relation with said circuits, means responsive to a substation switch of a calling line serving to actuate mechanism at one end of a circuit to establish connection between such line and an idle link-circuit, an operator's switching station comprising means for learning the want of the calling subscriber and for transmitting directive currents to the mechanism at the distant end of the connected link to complete the wanted connection, a calling device for transmitting said currents, and manually actuated operators' keys for interchangeably connecting said device with link-circuits in connection with calling lines.

52. A telephone system comprising telephone lines, link-circuits at the exchange having automatically controlled selective switch mechanisms at both their ends and in normal selective relation with said circuits, means responsive to a substation switch of a calling line serving to actuate mechanism at one end of a circuit to establish connection between such line and an idle link-circuit, an operator's switching station comprising means for learning the want of the calling subscriber and for transmitting directive currents to the mechanism at the distant end of the connected link to complete the wanted connection, a calling device for transmitting said currents, manually actuated operators' keys for interchangeably connecting said device with link-circuits in connection with calling lines, and means automatically actuated on completion of a wanted connection to free said device from a connected trunk.

53. A telephone exchange system comprising a subscriber's telephone line, substation equipment including a receiver and switch hook, a trunk line, automatic selecting and connecting switch mechanism responsive to the removal of the receiver from its hook to connect said line to one end of said trunk line, other telephone lines, and automatic selecting and connecting switch mechanism under the control of the operator constituting the sole means for connecting the other end of said trunk line to a desired other telephone line.

54. A telephone exchange system comprising a subscriber's telephone line, substation equipment including a receiver and switch hook, a plurality of trunk lines, automatic selecting and connecting switch mechanism responsive to the removal of the receiver from its hook to connect said line to one end of an idle one of said trunk lines, other telephone lines, electromagnetically actuated selecting and connecting switch mechanism constituting the sole means for connecting the other end of the selected trunk line to a desired other telephone line, and means under the control of the operator for transmitting directive currents to actuate said electromagnetically actuated mechanism.

55. A telephone system comprising telephone lines, a link-circuit at the exchange having selecting and connecting switch mechanism normally in operative selective relation with its two ends, a switch at the calling substation, means responsive thereto to operate the mechanism at one end to establish connection between said link-circuit and the calling line, an operator's switching station, and means for operatively associating said station with said link-circuit for electrically adjusting the mechanism of said circuit to complete a connection to a called line.

56. A telephone system comprising telephone lines, a link-circuit at the exchange having selecting and connecting switch mechanism normally in operative relation with its two ends, a switch at a calling substation, means responsive thereto to operate the mechanism at one end to establish connection between said link-circuit and the calling line, and operator's calling device mechanism adapted to electrically adjust mechanism at the other end of said circuit to complete connection to a called line.

57. A telephone exchange system comprising a subscriber's telephone line, a plurality of trunk lines, automatic selecting and connecting switch mechanism responsive to switching operations performed at the substation to connect said line to one end of an idle one of said trunk lines, other telephone lines, electromagnetically actuated selecting and connecting switch mechanism constituting the sole means for connecting the other end of the selected trunk line to the desired other telephone line, and operator's means for transmitting directive currents to actuate said electromagnetically actuated mechanism.

In witness whereof, I hereunto sign my name this 14th day of August, 1906.

EDMUND LAND.

Witnesses:
H. H. IDE,
M. IRENE C. GRADY

Corrections in Reissue Letters Patent No. 12,943.

It is hereby certified that in Reissue Letters Patent No. 12,943, granted April 20, 1909, upon the application of Edmund Land, of Grand Rapids, Michigan, for an improvement in "Telephone-Exchange Systems," errors appear in the printed specification requiring correction, as follows: In lines 45, 48, and 106, page 2, line 83, page 4, and lines 89–90, page 5, the word "multiplied" should read *multipled;* line 1, page 5, the reference-numeral "139" should read *319;* line 55, same page, the reference-numeral "23" should read *53;* line 110, page 6, the word "this" should read *the;* and in line 25, page 7, the word "involuing" should read *involving;* and that the said Letters Patent should be read with these corrections therein that the same may conform to the record of the case in the Patent Office.

Signed and sealed this 25th day of May, A. D., 1909.

[SEAL.]

C. C. BILLINGS,
*Acting Commissioner of Patents.*